US012388551B2

(12) United States Patent
Liu et al.

(10) Patent No.: US 12,388,551 B2
(45) Date of Patent: Aug. 12, 2025

(54) METHOD AND DEVICE FOR TIME SYNCHRONIZATION OF TIME SYNCHRONIZATION DOMAINS

(71) Applicant: Moxa Inc., New Taipei (TW)

(72) Inventors: Chi-Chuan Liu, New Taipei (TW); Chun-Yu Lin, New Taipei (TW); Chien-Yu Lai, New Taipei (TW); Po-Hung Lin, New Taipei (TW)

(73) Assignee: Moxa Inc., New Taipei (TW)

( * ) Notice: Subject to any disclaimer, the term of this patent is extended or adjusted under 35 U.S.C. 154(b) by 342 days.

(21) Appl. No.: 18/207,152

(22) Filed: Jun. 8, 2023

(65) Prior Publication Data

US 2023/0421280 A1   Dec. 28, 2023

Related U.S. Application Data

(60) Provisional application No. 63/354,238, filed on Jun. 22, 2022.

(30) Foreign Application Priority Data

Mar. 15, 2023  (TW) ................. 112109568

(51) Int. Cl.
*H04J 3/06* (2006.01)
(52) U.S. Cl.
CPC .................. *H04J 3/0667* (2013.01)
(58) Field of Classification Search
CPC .......... H04J 3/0667; H04J 3/12; H04L 41/082
See application file for complete search history.

(56) References Cited

U.S. PATENT DOCUMENTS 8,064,485 B1 * 11/2011 Montini ............... H04L 43/106
398/154
8,693,506 B2 * 4/2014 Hadzic ................. H04J 3/0697
370/352

(Continued)

FOREIGN PATENT DOCUMENTS

CN   101009546 A   8/2007
CN   112688752 A   4/2021

(Continued)

OTHER PUBLICATIONS

IEEE Standard for a Precision Clock Synchronization Protocol for Networked Measurement and Control Systems, Technical Committee on Sensor Technology (TC-9) of the IEEE Instrumentation and Measurement Society, 2020, front & back covers & pp. 1-497, IEEE Std 1588™—2019, Revision of IEEE Std 1588-2008, IEEE Standards Association, XP068168211, 2020.

(Continued)

*Primary Examiner* — Bailor C Hsu
(74) *Attorney, Agent, or Firm* — Winston Hsu

(57) ABSTRACT

A time synchronization method for a time synchronization device, wherein the device is connected to a plurality of time synchronization domains through a plurality of ports, and the plurality of time synchronization domains use a plurality of PTP profiles. The method comprises determining whether each of the plurality of ports is a time receiving port or a time transmitting port; obtaining information of a grandmaster clock of the plurality of time synchronization domains; performing information conversion on the information of the grandmaster clock according to a PTP profile corresponding to each time transmitting port of the plurality of ports in the plurality of PTP profiles, so as to generate a plurality of clock information corresponding to each time transmitting port; and transmitting a corresponding clock information of the plurality of clock information to a corresponding time (Continued)

synchronization domain from each time transmitting port, so as to perform time synchronization.

16 Claims, 7 Drawing Sheets

(56) References Cited

U.S. PATENT DOCUMENTS

| | | | |
|---|---|---|---|
| 8,954,609 B1 | 2/2015 | Holleman | |
| 9,270,395 B2* | 2/2016 | Zheng | H04J 3/0667 |
| 9,369,896 B1* | 6/2016 | Huang | H04W 56/001 |
| 9,432,751 B2* | 8/2016 | Joergensen | H04J 3/0673 |
| 10,158,441 B1* | 12/2018 | Butterworth | H04W 56/0015 |
| 12,160,498 B1* | 12/2024 | Lior | H04J 3/0667 |
| 12,335,030 B2* | 6/2025 | Neugeboren | H04J 3/0667 |
| 2017/0359138 A1 | 12/2017 | Butterworth | |
| 2022/0103278 A1 | 3/2022 | Wang | |

FOREIGN PATENT DOCUMENTS

| | | |
|---|---|---|
| JP | 2022-56988 A | 4/2022 |
| TW | 202215811 A | 4/2022 |
| WO | 2013/189176 A2 | 12/2013 |
| WO | 2013/189176 A3 | 2/2014 |

OTHER PUBLICATIONS

Martin Langer et al., NTS4PTP—A Comprehensive key management solution for PTP networks, Computer Networks, May 31, 2022, pp. 1-28, 213 (2022) 109075, Elsevier, XP087138793, May 31, 2022.

\* cited by examiner

METHOD AND DEVICE FOR TIME SYNCHRONIZATION OF TIME SYNCHRONIZATION DOMAINS

CROSS REFERENCE TO RELATED APPLICATIONS

This application claims the benefit of U.S. Provisional Application No. 63/354,238, filed on Jun. 22, 2022. The content of the application is incorporated herein by reference.

BACKGROUND OF THE INVENTION

1. Field of the Invention

The present invention relates to a method and a device for time synchronization, and more particularly, to a method and a device for time synchronization in multiple time synchronization network domains.

2. Description of the Prior Art

Precision Time Protocol (PTP) is a standard for time synchronization defined by IEEE 1588, and is used to achieve high-precision time synchronization throughout a time-critical network. As the market evolves, different network applications have unique requirements. To address this, many different PTP profiles have been proposed for different applications, such as Power Profile (IEEE Std C37.238) for power networks, Telecom Profile (ITU-T G.8265.1) for telecommunication networks, and Generalized Precision Time Protocol (gPTP, IEEE Std 802.1AS). PTP profiles allow applications in different fields to set specific operating parameters, attributes, and default values to meet their requirements. However, this can make it difficult for devices and networks using different PTP profiles to communicate effectively. In general, in order to ensure time synchronization, apparatuses or devices in the same environment must use the same PTP profile, making cross-domain time integration challenging.

Currently, the gPTP defined by IEEE 802.1AS is used to achieve precise time synchronization in time-sensitive networks (TSN). The gPTP profile is one of the PTP profiles formulated according to IEEE 1588, which is simplified and optimized version of PTP for time-sensitive applications. However, under this protocol, all devices and network nodes need to support the gPTP profile to perform time synchronization in TSNs. This can be problematic for device manufacturers who need to update or modify devices using other types of PTP profiles to use the gPTP profile. Therefore, there is a need for improvement in this art.

SUMMARY OF THE INVENTION

Therefore, the main purpose of the present invention is to provide a method for integrating multiple devices or networks using different types of PTP profiles for time synchronization without affecting the accuracy of time synchronization, so as to improve the shortcoming of the prior art.

An embodiment of the present invention discloses a time synchronization method for a time synchronization device. The time synchronization device is connected to a plurality of time synchronization domains through a plurality of ports, and the plurality of time synchronization domains use a plurality of Precision Time Protocol (PTP) profiles. The time synchronization method comprising determining whether each of the plurality of ports is a time receiving port or a time transmitting port; obtaining information of a grandmaster clock of the plurality of time synchronization domains; performing information conversion on the information of the grandmaster clock according to a PTP profile corresponding to each time transmitting port of the plurality of ports in the plurality of PTP profiles, so as to generate a plurality of clock information corresponding to each time transmitting port of the plurality of ports; and transmitting a corresponding clock information of the plurality of clock information to a corresponding time synchronization domain from each time transmitting port of the plurality of ports, so as to perform time synchronization.

An embodiment of the present invention discloses a time synchronization device. The time synchronization device is connected to a plurality of time synchronization domains through a plurality of ports, and the plurality of time synchronization domains use a plurality of Precision Time Protocol (PTP) profiles. The time synchronization device comprises a processing unit and a storage unit. The processing unit, configured to execute a program code. The storage unit, coupled to the processing unit, configured to store the program code to instruct the processing unit to execute a time synchronization method. The time synchronization method comprises determining whether each of the plurality of ports is a time receiving port or a time transmitting port; obtaining information of a grandmaster clock of the plurality of time synchronization domains; performing information conversion on the information of the grandmaster clock according to a PTP profile corresponding to each time transmitting port of the plurality of ports in the plurality of PTP profiles, so as to generate a plurality of clock information corresponding to each time transmitting port of the plurality of ports; and transmitting a corresponding clock information of the plurality of clock information to a corresponding time synchronization domain from each time transmitting port of the plurality of ports, so as to perform time synchronization.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to".

Figure 1:
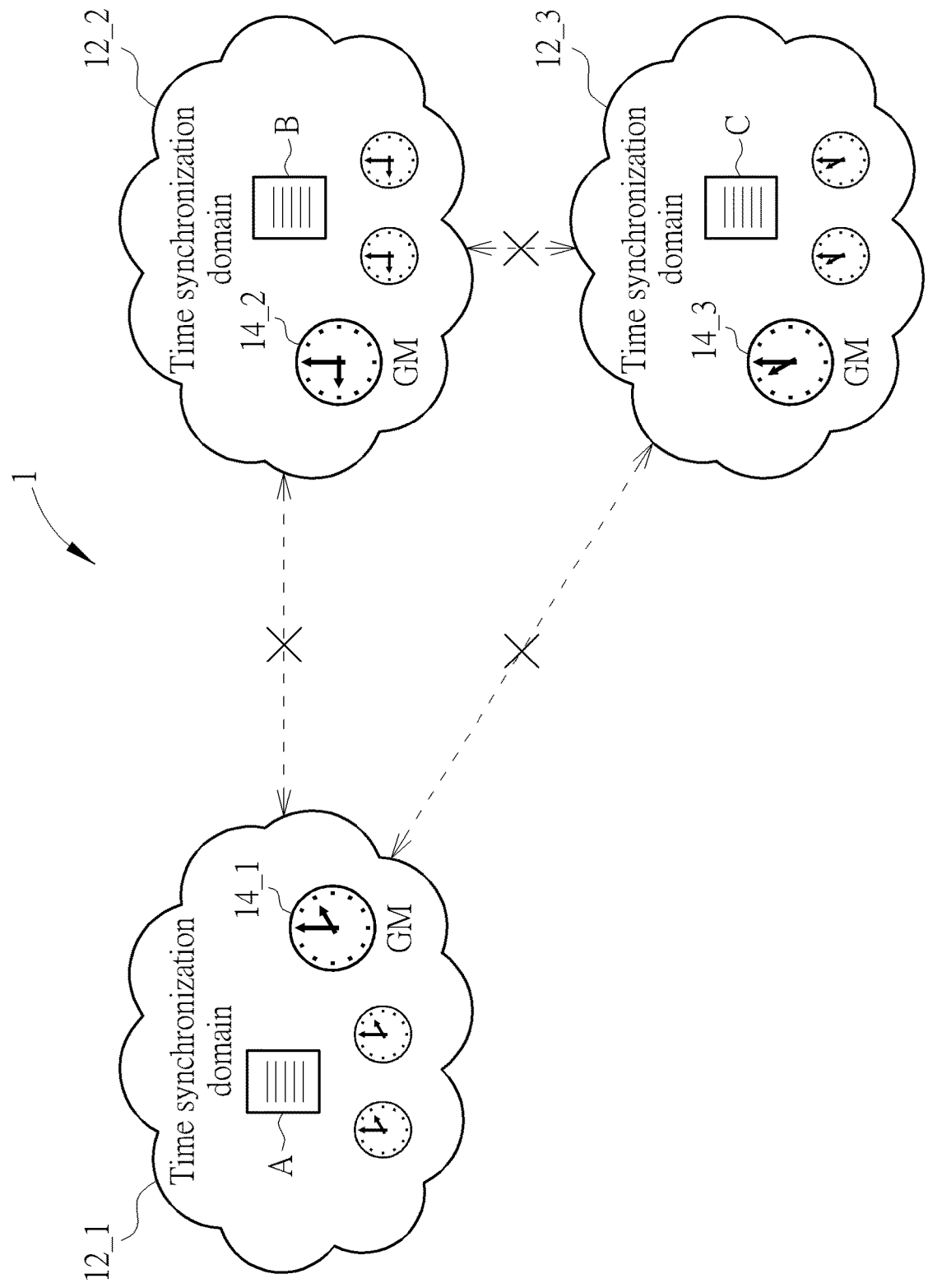
FIG. 1 is a schematic diagram of a network system.

Please refer to FIG. 1, which is a schematic diagram of a network system 1. The network system 1 comprises time synchronization domains 12_1-1_3, wherein each time synchronization domain may be a wired network, a wireless network, or a network domain composed of combinations thereof, may be a network domain composed of multiple devices, network switches and the like (including multiple clocks), or may be a network domain composed of only a single device (including merely one clock). The time synchronization domains 12_1-12_3 are respectively time synchronization domains operating according to the specifications of different types of Precision Time Protocol (PTP) profiles A-C. It should be noted that, since the time synchronization domains 12_1-12_3 operate time synchronization mechanisms according to different PTP profiles A-C, cross-domain integration for time synchronization cannot be performed. In this situation, each time synchronization domain may have an optimal clock (such as the optimal clock 14_1-14_3 in FIG. 1) to run as a grandmaster (GM) clock of each time synchronization domain. In other words, devices belonging to the same network domain perform time synchronization according to the grandmaster clock of the network domain to which they belong. The optimal clock refers to the most ideal clock suitable for a specific time synchronization domain evaluated based on factors such as time source, time accuracy, and oscillator stability, and may also be a clock that is determined to be most suitable for a specific time synchronization domain by users. In this situation, when a manufacturer intends to replace or add a new device in a network domain, the new device must be compatible with the PTP profile used by the network domain; when a device manufacturer develops the device, customization and adjustment should be performed separately for different types of PTP profiles so as to be applicable in different fields; when the network domain needs to integrate with other specific time synchronization domains, updates for all the apparatuses and network devices may be required to be compatible with the generalized Precision Time Protocol (gPTP) profile.

In order to ensure that all devices in the network system 1 reach time synchronization based on a same grandmaster clock without affecting the accuracy of time synchronization, the present invention provides a time synchronization device, which may be connected to the time synchronization domains 12_1-12_3, to integrate the time of different time synchronization domains. Specifically, please refer to FIG. 2, which is a schematic diagram of a time synchronization network system 2 according to an embodiment of the present invention. The time synchronization network system 2 comprises the time synchronization domain 12_1-12_3 and a time synchronization device 10. The time synchronization device 10 may be a network device such as a gateway, a switch, a router, or a bridge, running in the network, and is not limited thereto. The time synchronization device 10 is connected to the time synchronization domains 12_1-12_3 through ports 16_1-16_3 respectively. In the embodiment of the present invention, the time synchronization domains 12_1-12_3 may perform time synchronization through the time synchronization device 10 according to a time synchronization method, so that all apparatuses and devices in the time synchronization domains 12_1-12_3 may be synchronized according to a grandmaster clock 14_1 of a specified network domain. In addition, in the time synchronization network system 2, the number of time synchronization domains 12_1 to 12_3 is 3, which is for illustration. The time synchronization device 10 of the embodiment of the present invention may be applied to any number of time synchronization domains for time synchronization, and is not limited thereto.

Figure 3:
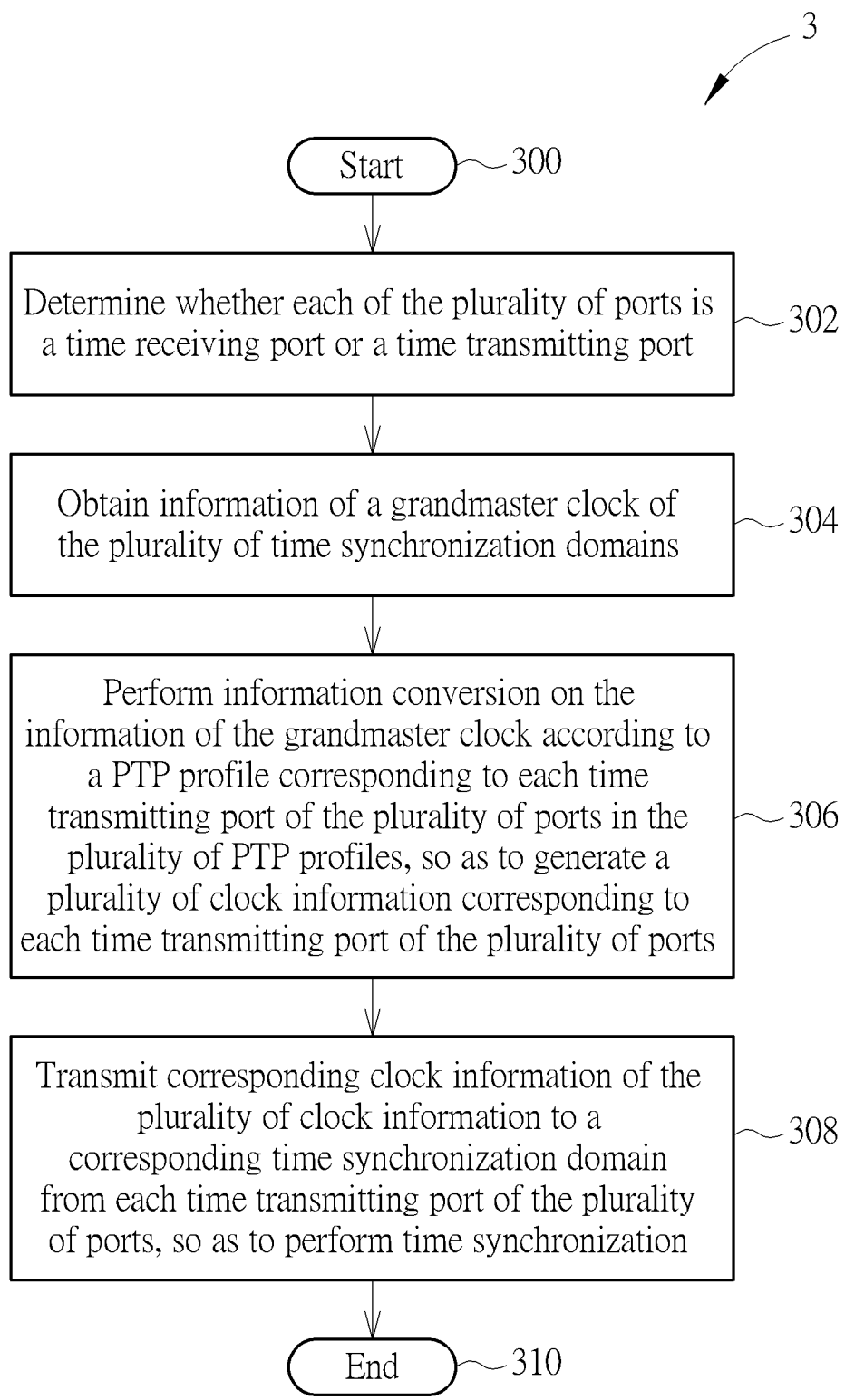
FIG. 3 is a flowchart of a time synchronization method according to an embodiment of the present invention.

The time synchronization method of the present invention may be summarized into a process 3 as shown in FIG. 3, and the process 3 comprises the following steps:

Step 300: Start.

Step 302: Determine whether each of the plurality of ports is a time receiving port or a time transmitting port.

Step 304: Obtain information of a grandmaster clock of the plurality of time synchronization domains.

Step 306: Perform information conversion on the information of the grandmaster clock according to a PTP profile corresponding to each time transmitting port of the plurality of ports in the plurality of PTP profiles, so as to generate a plurality of clock information corresponding to each time transmitting port of the plurality of ports.

Step 308: Transmit corresponding clock information of the plurality of clock information to a corresponding time synchronization domain from each time transmitting port of the plurality of ports, so as to perform time synchronization.

Step 310: End.

According to the process 3, the time synchronization device 10 firstly determines that each of the plurality of ports is a time receiving port or a time transmitting port (Step 302). The time receiving port refers to the port used to receive information such as the clock and time, or the port with port state (portState) set to be SlavePort according to the specification of PTP; the time transmitting port refers to the port used to transmit information such as clock and time, or the port with port state set to be MasterPort according to the specification of PTP. After determining each port to be a time receiving port or a time transmitting port, the time synchronization 10 needs to further obtain the information related to the grandmaster clock (Step 304). Accordingly, the time synchronization device 10 needs to perform information conversion on the information of the grandmaster clock according to a PTP profile corresponding to each time transmitting port of the plurality of ports in the plurality of PTP profiles, so as to generate clock information corresponding to each time transmitting port (Step 306), and then send clock information from each time transmitting port to the corresponding time synchronization domain (step 308), so as to synchronize time. Accordingly, all the time synchronization domains connected to the time synchronization device 10 may operate according to the time of the same grandmaster clock.

In other words, the time synchronization device 10 receives the clock-related information sent from the grandmaster clock through the time receiving port, performs information conversion on the grandmaster clock information according to the PTP profile corresponding to the time transmitting port, and then sends the converted clock information to the corresponding time synchronization domain through each time transmitting port. Accordingly, all the devices and apparatuses of the time synchronization network system 2 may operate according to the time of the same grandmaster clock.

Figure 2:
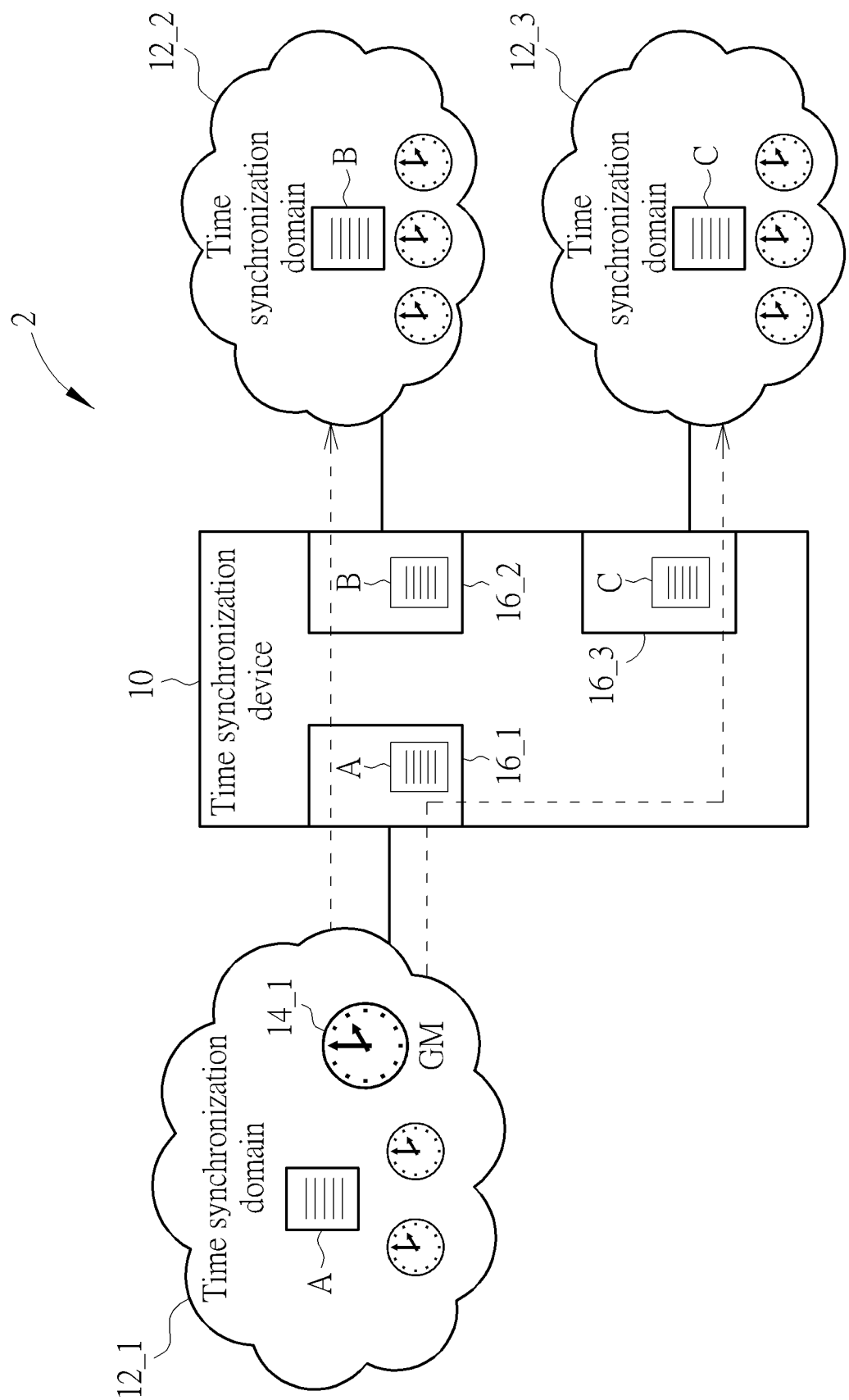
FIG. 2 is a schematic diagram of a time synchronization network system according to an embodiment of the present invention.

Specifically, taking FIG. 2 as an example, the time synchronization device 10 first determines each of the ports 16_1-16_3 to be a time receiving port or a time transmitting port. In an embodiment, the time synchronization device 10 may first determine the PTP profile A of the time synchronization domain 12_1 to which the grandmaster clock 14_1 belongs, and then compare with the PTP profiles corresponding to all the ports 16_1-16_3 of the time synchronization device 10 one by one. When the PTP profile corresponding to one of the ports 16_1-16_3 is the same as the PTP profile A, the port is determined to be a time receiving port (i.e., the port 16_1), and the other ports (i.e., the ports 16_2 and 16_3) are determined to be time transmitting ports. Since the time receiving port 16_1 receives clock-related information, such as announce message or sync message, sent from the grandmaster clock 14_1 of the time synchronization domain 12_1, the time synchronization device 10 may obtain time information related to the grandmaster clock through the time receiving port 16_1. Furthermore, the time synchronization device 10 needs to perform information conversion for the PTP profiles B and C respectively, i.e., for the time synchronization domains 12_2 and 12_3 corresponding to the time transmitting ports 16_2 and 16_3, so as to generate the clock information corresponding to the time synchronization domains 12_2, 12_3. Finally, the time synchronization device 10 sends converted clock information to the corresponding time synchronization domains 12_1, 12_3 through the time transmitting ports 16_2 and 16_3, so as to synchronize the time.

As can be seen from the above, the time synchronization device 10 receives information of the grandmaster clock 14_1 from the time synchronization domain 12_1 through the time receiving port 16_1, wherein the information includes clock-related information and time information. The information of the grandmaster clock 14_1 received from the time synchronization domain 12_1 is the information transmitted according to the PTP profile A, so the time synchronization device 10 needs to perform format and information conversion to produce the information suitable for network domains using different PTP profiles. Therefore, the time synchronization device 10 converts the information of the grandmaster clock 14_1 received by the time receiving port 16_1 according to the PTP profiles B and C corresponding to the time synchronization domains 12_2 and 12_3 respectively, and finally sends the time information with format conversion to the time synchronization domains 12_2 and 12_3 through the time transmitting ports 16_2 and 16_3 respectively. Accordingly, the time synchronization cross network domains using various types of PTP profiles may be realized.

Figure 4:
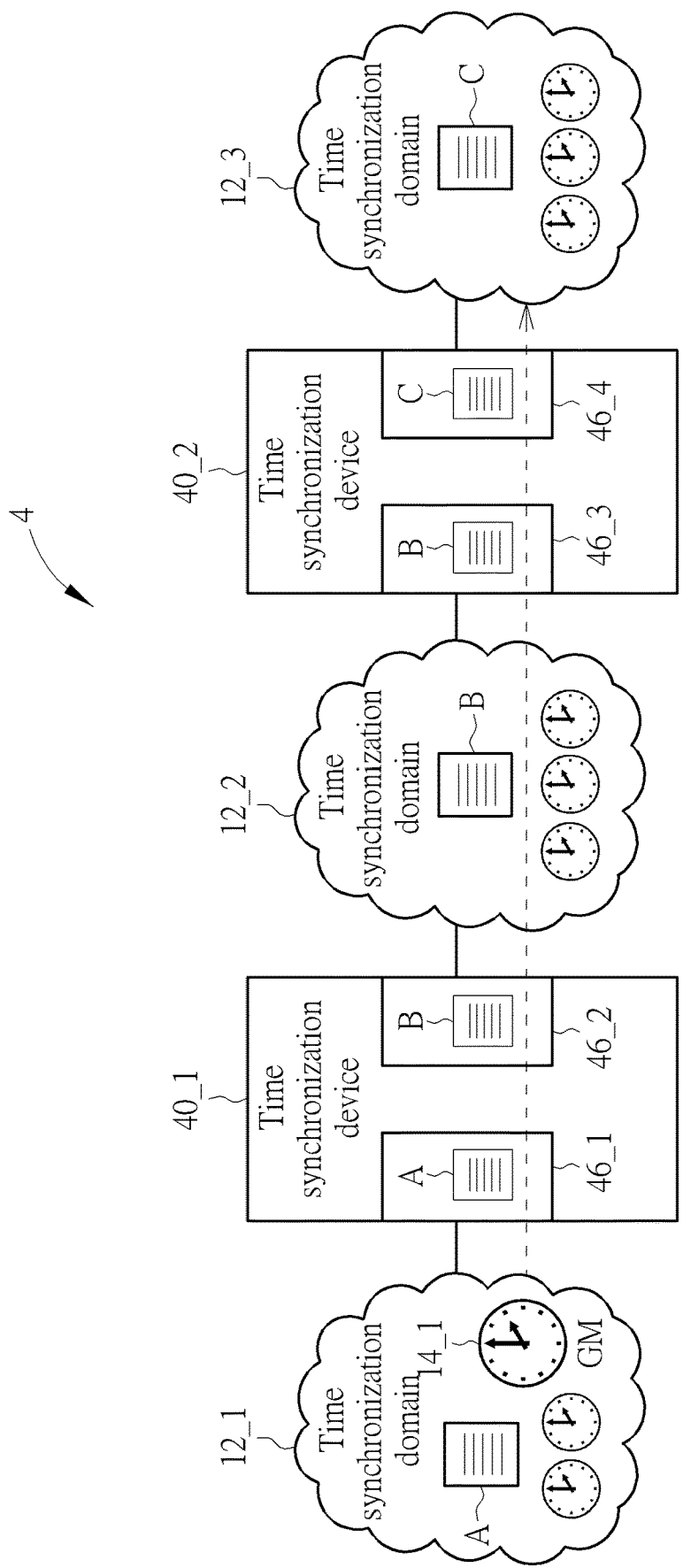
FIG. 4 is a schematic diagram of a time synchronization network system comprising two time synchronization devices according to an embodiment of the present invention.

In FIG. 2, by utilizing a single time synchronization device and referring to the process 3, the time synchronization network system 2 achieves that all time synchronization domains connected to the time synchronization device 10 operate according to the time of the same grandmaster clock, so as to synchronize time. Those skilled in the art may make appropriate modifications according to the needs of the system, and are not limited thereto. For example, please refer to FIG. 4, which is a schematic diagram of a time synchronization network system 4 according to an embodiment of the present invention. In this embodiment, the time synchronization network system 4 performs time synchronization for the time synchronization domains 12_1-12_3 through two time synchronization devices 40_1 and 40_2. The time synchronization device 40_1 is connected to the time synchronization domains 12_1 and 12_2 through ports 46_1 and 46_2 respectively, and the time synchronization device 40_2 is connected to the time synchronization domains 12_2 and 12_3 through the connection ports 46_3 and 46_4 respectively. Similar to the operating way of the time synchronization device 10, after determining the time synchronization domain to which the grandmaster clock 14_1 belongs, the time synchronization device 40_1 may determine the corresponding PTP profile A, thereby determining the port 46_1 to be a time receiving port and the port 46_2 to be a time transmitting port. Therefore, through the time synchronization device 40_1, the information of the grandmaster clock 14_1 related to the PTP profile A may be received by the time receiving port 46_1, and time information corresponding to the PTP profile B is then sent to the time synchronization domain 12_1 through the time transmitting port 46_2 after information and format conversion. In this situation, the time synchronization domain 12_2 may be synchronized according to the grandmaster clock 14_1 located in the time synchronization domain 12_1. Correspondingly, since information of the grandmaster clock 14_1 is transmitted to the time synchronization device 40_2 through the time synchronization domain 12_2, the time synchronization device 40_2 may determine the port 46_3 to be a time receiving port and the port 46_4 to be a time transmitting port. Therefore, through the time synchronization device 40_2, the information of the grandmaster clock 14_1 related to the PTP profile B may be received by the time receiving port 46_3, and time information corresponding to the PTP profile C is then sent to the time synchronization domain 12_3 through the time transmitting port 46_4 after information and format conversion. Accordingly, the time synchronization network system 4 may achieve time synchronization for the time synchronization domains 12_1-12_3 by utilizing the two time synchronization devices 40_1 and 40_2.

Figure 5:
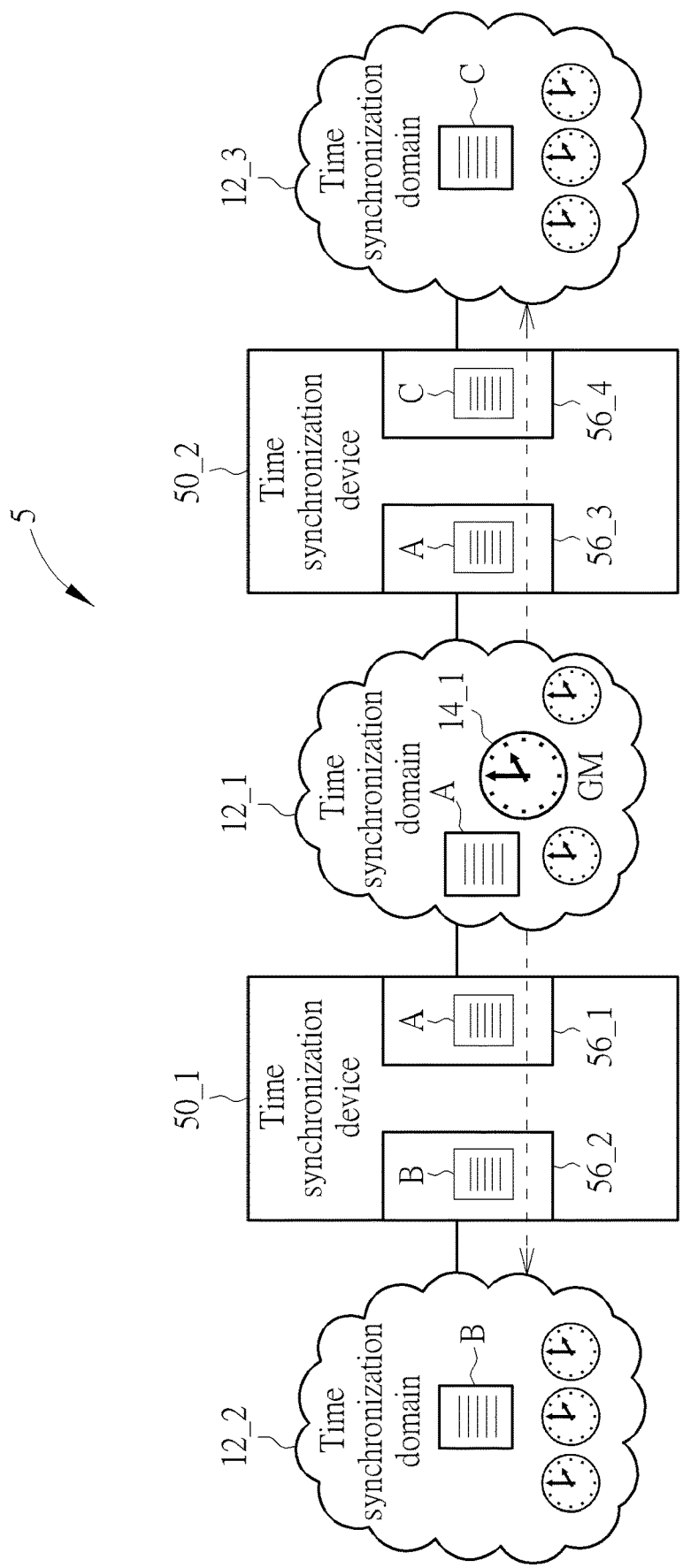
FIG. 5 is a schematic diagram of a time synchronization network system comprising two time synchronization devices according to an embodiment of the present invention.

Please refer to FIG. 5, which is a schematic diagram of a time synchronization network system 5 according to an embodiment of the present invention. In this embodiment, the time synchronization network system 5 performs time synchronization for the time synchronization domains 12_1-12_3 through two time synchronization devices 50_1 and 50_2. The time synchronization device 50_1 is connected to the time synchronization domains 12_1 and 12_2 through ports 56_1 and 56_2 respectively, and the time synchronization device 50_2 is connected to the time synchronization domains 12_1 and 12_3 through the connection ports 56_3 and 56_4 respectively. After determining the time synchronization domain to which the grandmaster clock 14_1 belongs, the time synchronization device 50_1 may determine the corresponding PTP profile A, thereby determining the port 56_1 to be a time receiving port and the port 56_2 to be a time transmitting port. Through the time synchronization device 50_1, the information of the grandmaster clock 14_1 related to the PTP profile A may be received by the time receiving port 56_1, and time information corresponding to the PTP profile B is then sent to the time synchronization domain 12_2 through the time transmitting port 56_2 after information and format conversion. Accordingly, the time synchronization domain 12_2 may be synchronized according to the grandmaster clock 14_1 located in the time synchronization domain 12_1. Similarly, the time synchronization device 50_2 may determine the port 56_3 to be a time receiving port and the port 56_4 to be a time transmitting port. Through the time synchronization device 50_2, the information of the grandmaster clock 14_1 related to the PTP profile A may be received by the time receiving port 56_3, and time information corresponding to the PTP profile C is then sent to the time synchronization domain 12_3 through the time transmitting port 56_4 after information and format conversion. Accordingly, the time synchronization network system 5 may achieve time synchronization for the time synchronization domains 12_1-12_3 by utilizing the two time synchronization devices 50_1 and 50_2.

Figure 6:
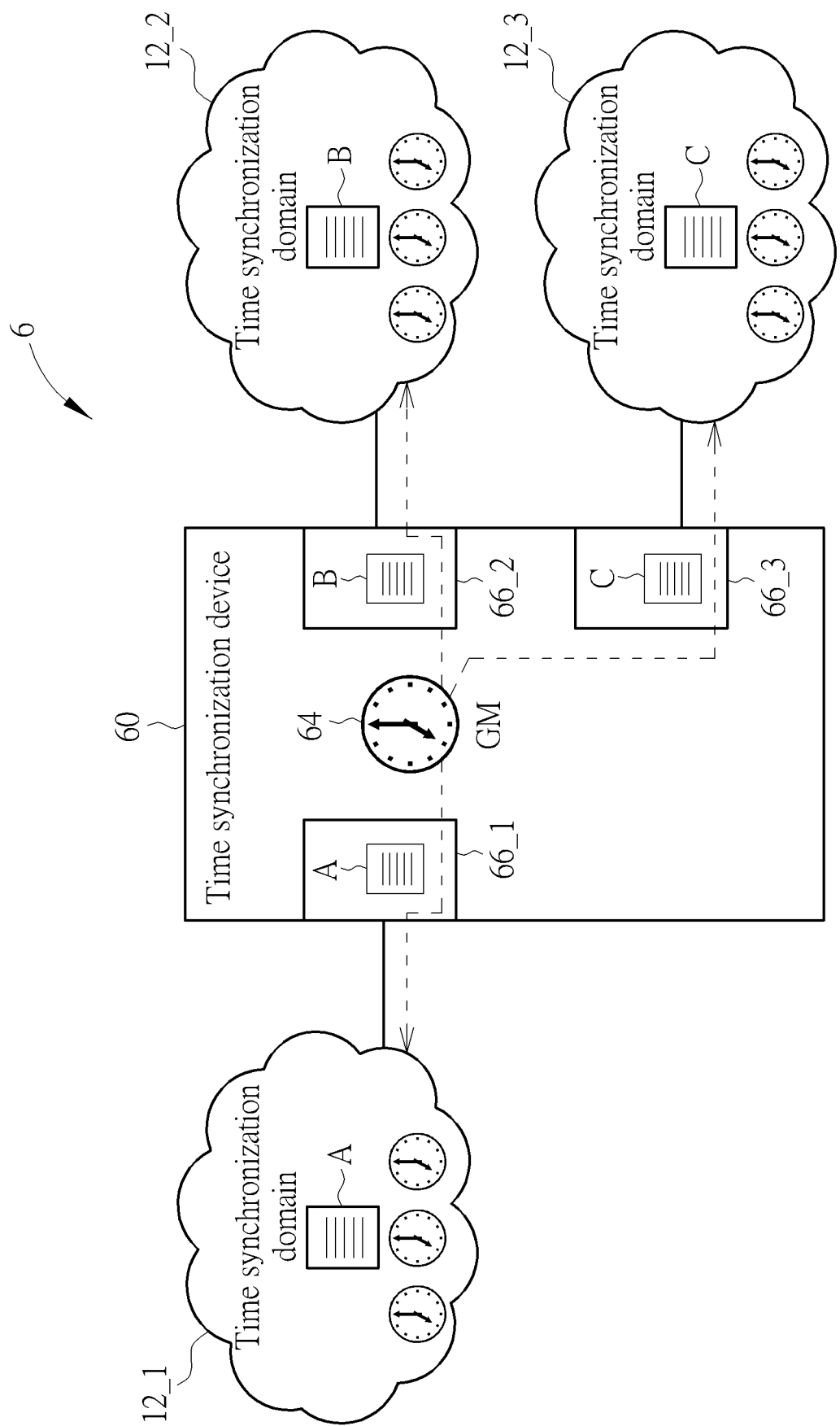
FIG. 6 is a schematic diagram of a time synchronization network system for synchronizing with the time of a time synchronization device according to an embodiment of the present invention.

In the above embodiment, the time synchronization devices determine whether each of the ports is a time receiving port or a time transmitting port by comparing the PTP profile corresponding to the grandmaster clock with the PTP profile corresponding to each port. In another embodiment, a clock of the time synchronization device may be the grandmaster clock; in other words, the grandmaster clock does not belong to any time synchronization domain connected to the time synchronization device. In this situation, time synchronization may still be performed according to the process 3. Please refer to FIG. 6, which is schematic diagram of a time synchronization network system 6 according to an embodiment of the present invention. The time synchronization network system 6 comprises the time synchronization domains 12_1-12_3 and a time synchronization device 60. In this embodiment, the time synchronization network system 6 takes a clock 64 of the time synchronization device 6 as the grandmaster clock, and accordingly synchronizes the time for time synchronization domains 12_1-12_3. In the embodiment, the grandmaster clock 64 does not belong to any of the time synchronization domains 12_1-12_3 connected to the time synchronization device 60, and therefore the time synchronization device 60 may determine each of the ports 66_1-66_3 to be a time transmitting port (Step 302). Since the time synchronization device 60 does not have a time receiving port, the information of the grandmaster clock 64 is directly obtained from the time synchronization device 60 (Step 304). And, the time synchronization device 60 needs to perform information conversion on the PTP profiles A, B, and C used by the time synchronization domains 12_1-12_3 corresponding to the time transmitting ports 66_1-66_3, so as to generate clock information corresponding to the time synchronization domains 12_1-12_3 (Step 306). Finally, the converted clock information is sent to the corresponding time synchronization domains 12_1-12_3 through the time transmitting ports 66_1-66_3 (Step 308), so as to synchronize the time. Accordingly, all of the time synchronization domains 12_1-12_3 may operate according to the time of the grandmaster clock 64 provided by the time synchronization device 60.

It should be noted that the time synchronization network systems 2, 4, 5, and 6 in the above embodiments comprise 3 time synchronization domains and 1 or 2 time synchronization devices, which are for illustration purposes. The embodiment of the present invention may be applied to any number or combination of the time synchronization domains and time synchronization devices, and is not limited thereto. Those skilled in the art should adopt an appropriate network topology according to actual requirements.

Figure 7:
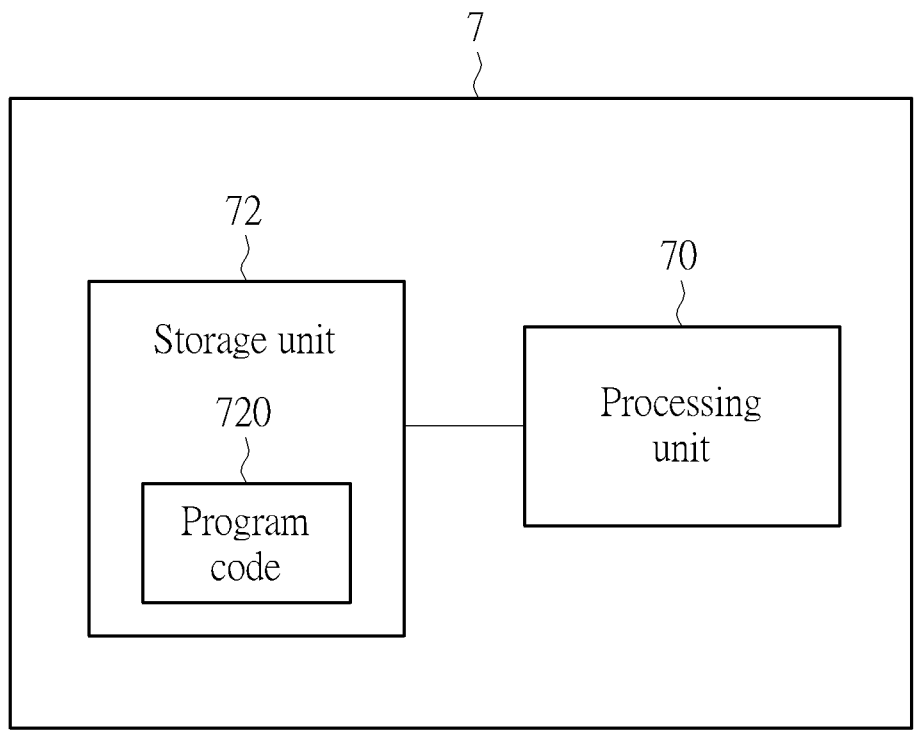
FIG. 7 is a schematic diagram of a network device according to an embodiment of the present invention.

Furthermore, please refer to FIG. 7, which is a schematic diagram of a network device 7 according to an embodiment of the present invention. The network device 7 may be a gateway, a switch, a router, or a bridge operating in the network, but is not limited thereto. Any network device 7 with multiple ports may be used to implement the time synchronization devices 10, 40_1, 40_2, 50_1, 50_2 and 60 of the embodiment of the present invention. As shown in FIG. 7, the network device 7 may comprise a processing unit 70 and a storage unit 72. The processing unit 70 may be a general-purpose processor, a microprocessor, an application-specific integrated circuit (ASIC), or combination thereof. The storage unit 72 is coupled to the processing unit 70 and may be any type of data storage devices for storing a program code 720, and the program code 720 is read and executed by the processing unit 70. For example, the storage unit 72 may be a read-only memory (ROM), a flash memory, a random-access memory (RAM), a hard disk, an optical data storage device, a non-volatile storage unit, etc., and is not limited thereto.

The network device 7 is used to represent the necessary components required to implement the embodiments of the present invention, and those skilled in the art may make various modifications and adjustments accordingly, and is not limited to this. For example, when the network device 7 is applied to implement the time synchronization device, the process 3 for the time synchronization method may be compiled into the program code 720, stored in the storage unit 72, and executed by the processing unit 70. Moreover, the storage unit 72 is also used for storing the related information about the grandmaster clock, the PTP profiles and data required for running the time synchronization method, and is not limited thereto.

In summary, the present invention provides a time synchronization method and device, which realizes cross-domain time synchronization for multiple time synchronization domains using different PTP profiles and improves the lack of integration flexibility in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A time synchronization method for a time synchronization device, wherein the time synchronization device is connected to a plurality of time synchronization domains through a plurality of ports, and the plurality of time synchronization domains use a plurality of Precision Time Protocol (PTP) profiles, the time synchronization method comprising:
   determining whether each of the plurality of ports is a time receiving port or a time transmitting port;
   obtaining information of a grandmaster clock of the plurality of time synchronization domains;
   performing information conversion on the information of the grandmaster clock according to a PTP profile corresponding to each time transmitting port of the plurality of ports in the plurality of PTP profiles, so as to generate a plurality of clock information corresponding to each time transmitting port of the plurality of ports; and
   transmitting a corresponding clock information of the plurality of clock information to a corresponding time synchronization domain from each time transmitting port of the plurality of ports, so as to perform time synchronization.

2. The time synchronization method of claim 1, wherein the step of determining whether each of the plurality of ports is a time receiving port or a time transmitting port comprises:

determining a first PTP profile of a time synchronization domain to which the grandmaster clock belongs;

comparing the plurality of PTP profiles with the first PTP profile to generate a plurality of comparison results; and determining one of the plurality of ports to be a time receiving port and the other ports to be time transmitting ports according to the plurality of comparison results.

3. The time synchronization method of claim 2, wherein the step of determining one of the plurality of ports to be a time receiving port and the other ports to be time transmitting ports according to the plurality of comparison results comprises when one of the plurality of comparison results shows that a PTP profile corresponding to a port conforms to the first PTP profile, determining the port to be the time receiving port and the other ports to be the time transmitting port.

4. The time synchronization method of claim 2, wherein the step of obtaining the information of the grandmaster clock of the plurality of time synchronization domains comprises receiving the information of the grandmaster clock from the time receiving port.

5. The time synchronization method of claim 1, wherein the step of determining whether each of the plurality of ports is a time receiving port or a time transmitting port comprises determining each of the plurality of ports to be a time transmitting port when a clock of the time synchronization device is the grandmaster clock.

6. The time synchronization method of claim 5, wherein the step of obtaining the information of the grandmaster clock of the plurality of time synchronization domains comprises obtaining the information of the grandmaster clock by the time synchronization device.

7. The time synchronization method of claim 1, wherein the time synchronization device is a gateway, a switch, a router, or a bridge.

8. The time synchronization method of claim 1, wherein the plurality of PTP profiles are different.

9. A time synchronization device, wherein the time synchronization device is connected to a plurality of time synchronization domains through a plurality of ports, and the plurality of time synchronization domains use a plurality of Precision Time Protocol (PTP) profiles, the time synchronization device comprising:

a processing unit, configured to execute a program code; and a storage unit, coupled to the processing unit, configured to store the program code to instruct the processing unit to execute a time synchronization method, wherein the time synchronization method comprises:

determining whether each of the plurality of ports is a time receiving port or a time transmitting port;

obtaining information of a grandmaster clock of the plurality of time synchronization domains;

performing information conversion on the information of the grandmaster clock according to a PTP profile corresponding to each time transmitting port of the plurality of ports in the plurality of PTP profiles, so as to generate a plurality of clock information corresponding to each time transmitting port of the plurality of ports; and transmitting a corresponding clock information of the plurality of clock information to a corresponding time synchronization domain from each time transmitting port of the plurality of ports, so as to perform time synchronization.

10. The time synchronization device of claim 9, wherein the step of determining whether each of the plurality of ports is a time receiving port or a time transmitting port comprises:

determining a first PTP profile of a time synchronization domain to which the grandmaster clock belongs;

comparing the plurality of PTP profiles with the first PTP profile to generate a plurality of comparison results; and determining one of the plurality of ports to be a time receiving port and the other ports to be time transmitting ports according to the plurality of comparison results.

11. The time synchronization device of claim 10, wherein the step of determining one of the plurality of ports to be a time receiving port and the other ports to be time transmitting ports according to the plurality of comparison results comprises when one of the plurality of comparison results shows that a PTP profile corresponding to a port conforms to the first PTP profile, determining the port to be the time receiving port and the other ports to be the time transmitting port.

12. The time synchronization device of claim 10, wherein the step of obtaining the information of the grandmaster clock of the plurality of time synchronization domains comprises receiving the information of the grandmaster clock from the time receiving port.

13. The time synchronization device of claim 9, wherein the step of determining whether each of the plurality of ports is a time receiving port or a time transmitting port comprises determining each of the plurality of ports to be a time transmitting port when a clock of the time synchronization device is the grandmaster clock.

14. The time synchronization device of claim 13, wherein the step of obtaining the information of the grandmaster clock of the plurality of time synchronization domains comprises obtaining the information of the grandmaster clock by the time synchronization device.

15. The time synchronization device of claim 9, being a gateway, a switch, a router, or a bridge.

16. The time synchronization device of claim 9, wherein the plurality of PTP profiles are different.

* * * * *